Jan. 9, 1962  G. J. HOWARD, JR  3,016,109
AIR FILTER
Filed March 17, 1958

INVENTOR
GEORGE J. HOWARD JR.
BY
AGENT

3,016,109
AIR FILTER

George J. Howard, Jr., Fairfield, Conn., assignor to United Aircraft Corporation, East Hartford, Conn., a corporation of Delaware
Filed Mar. 17, 1958, Ser. No. 721,704
13 Claims. (Cl. 183—61)

This invention relates to means for filtering air to be admitted to the inlet of a powerplant. This means also includes a device for heating the air before it enters said powerplant.

It is an object of this invention to provide a filter at the inlet of a powerplant to remove foreign particles from the air entering said powerplant.

Another object of this invention is to provide a filter having its filtering inlet formed having a surface of revolution.

A further object of this invention is to provide means for removing any accumulation of foreign matter from the outer surface of said filter.

Another object of this invention is to provide a filter in which a reverse flow of fluid is passed through said filter to remove any foreign matter therefrom.

A further object of this invention is to provide a circular filter having a scanning nozzle mounted to rotate about the periphery of said filter to direct a reverse flow of air through said filter throughout the full 360° of rotation of said nozzle.

Another object of this invention is to provide means for deicing the filter to prevent ice formation by heating the air being passed through said nozzles.

A further object of this invention is to provide means for driving a scanning nozzle by directing a flow of air from the compressor of an engine to a small turbine drive.

Another object of this invention is to provide means for bypassing the filtering surface when it has become blocked by foreign matter including ice or when it is not required.

A further object of this invention is to provide a control for operating an air filtering means along with a bypass means.

These and other objects of this invention will become readily apparent from the following detailed description of the drawings.

Figure 1:
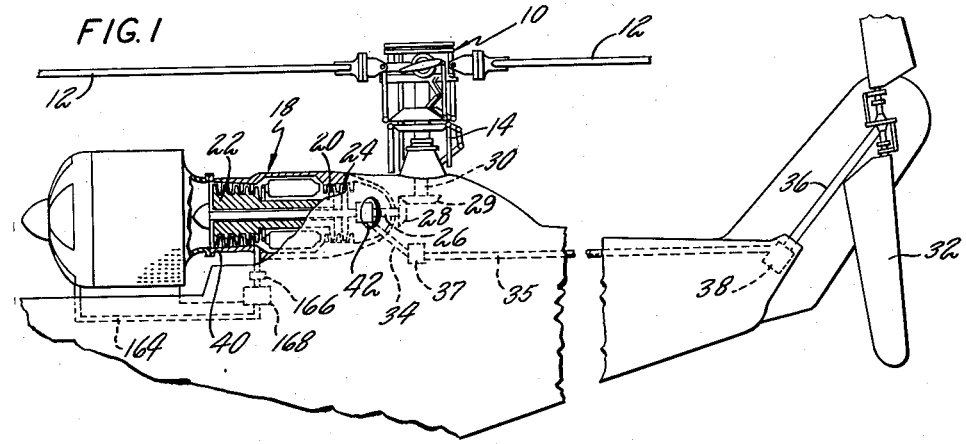
FIG. 1 is a fragmentary view of a helicopter having a turbine powerplant installation with filtering means in accordance with this invention.

Referring to FIG. 1, a helicopter installation is shown having a turbine type powerplant mounted on the top thereof having a rear drive for the rotor head. The helicopter has its main rotor 10, including variable pitch blades 12, connected to control mechanism within the helicopter by linkage 14. A further disclosure of a control mechanism which can be used in this instance is clearly illustrated in U.S. Patent No. 2,811,324 which issued on October 29, 1957.

As seen herein, a turbine type powerplant is generally indicated at 18. The powerplant has a first stage turbine 20 which drives the compressor 22. A second stage turbine 24 has no connection to the turbine 20 nor the compressor 22 but drives the rotor 10 by way of the shaft 26, gears 28 and 29 and shaft 30. Since the second stage turbine 24 has no direct connection to the remainder of the powerplant, it is referred to as a free turbine. The free turbine 24 also drives a tail rotor 32 by way of shafts 34, 35, 36 and couplings 37 and 38. The powerplant has an inlet 40 and an exhaust 42.

The air filtering means for the inlet 40 of the turbine powerplant 18 has five main parts. They are the following: (1) the housing 44, (2) the scanning blower 46, (3) the bearing assembly 48 for said blower, (4) the driving assembly 50 for said blower, and (5) the bypass mechanism 52. An integrated control system cooperates with said air filtering means to operate it in its intended manner as will be hereinafter described.

The housing comprises a perforated filtering cylinder 54 with an inwardly directed duct 56 attached to one end which adapts the circumference of the filtering cylinder to the smaller circumference of the air inlet opening 40 of the engine. While the shape of the perforated filtering inlet is shown having the shape of a cylinder, it is to be understood inlets having other surfaces of revolution can be used. By surface of revolution, it is meant a surface conceived as formed by the revolution of a plane curve, including a straight line, about a line in its plane. A flange 58 on the reduced end of the duct 56 is fixed to a flange 60 at the inlet 40 of the turbine engine by the use of bolts 62. The larger diameter of the duct 56 is shown fixed to the one end of the filtering cylinder 54 by welding.

Figure 3:
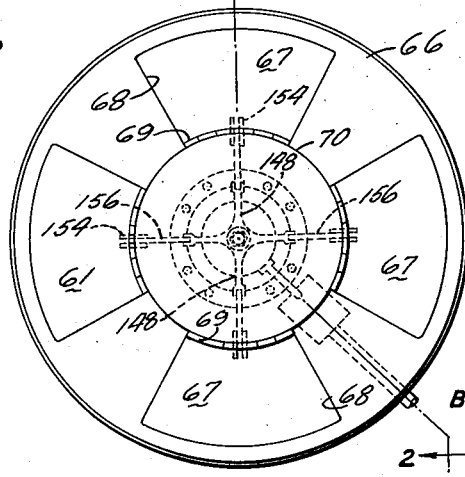
FIG. 3 is an enlarged front view of the filter as shown in FIG. 1.

A nose section 64 completes the housing 44 and is attached to the other end of the filtering cylinder 54. This attachment is shown as being a welded connection with the nose section projecting forwardly from the cylinder. This nose section provides a streamlined fairing for the front of the air filtering means and houses the driving assembly 50 and bypass mechanism 52. The nose section where it is attached to the cylinder 54 is formed as an annular section 66 having openings 68 therearound. A bypass flap 67 is hinged to the section 66 at the inner edge 69 of each opening 68. As viewed in FIG. 3, four (4) flaps 67 are hinged around the inner edges of the four (4) openings 68. A smaller nose cone 70 projects forwardly from the hole formed by the center of annular section 66. The operation of said flaps will be hereinafter described. The air filtering means can be externally supported by any means desired, such as by arms to the fuselage.

An annular mounting plate 72 is fixed within said housing with its outer circumference welded within said housing at 74. Openings 73 are spaced around the plate, one for each opening 68. The scanning blower 46 comprises an elongated nozzle 76 positioned so that its opening is directed against the inner surface of the cylinder 54. The nozzle extends the length of the cylinder and has a narrow width. Here again, while the nozzle extends as a straight line to complement the surface of the cylinder, if another surface of revolution is used, the nozzle will be so formed so that its opening would be adjacent the inner surface of the filtering member. This nozzle is supported on one end of a hollow arm 78 which also carries the fluid to the nozzle. The other end of the arm 78 is constructed having a cylindrical portion 80 with a shoulder 82. The axis of this cylindrical section 80 coincides with the axis of the center of the annular mounting plate 72 and extends through said plate.

The bearing assembly 48 for said scanning blower comprises a supporting cylinder 84 which projects through the opening in the annular mounting plate 72 into the cylinder 54 around the cylindrical section 80 of the scanning blower. A flange 85 on cylinder 84 abuts the outer face of plate 72 around its center hole and is fixed thereto. Two outer races 86 and 88 are fixed within said supporting cylinder 84. These races 86 and 88 are shown fixedly held at each end of a spacer 90 by an annular nut 92 threaded in one end of the mounting cylinder 84 and a snap ring 94 set in the other end of said cylinder. Inner races 96 and 98 are fixed on the cylindrical portion 80 of the scanning blower 46 to cooperate respectively with outer races 86 and 88, inner race 98 being positioned against the shoulder 82. Ball bearings are shown located between the two races. A sealing ring 100 is positioned between the rotatable cylindrical portion 80 of the scanning blower and the inner face of the stationary annular nut 92.

This mounting connection for the scanning blower 46 permits the blower to rotate freely 360° within the perforated filtering cylinder 54 with the nozzle 76 being capable of directing a flow of fluid against the entire inner surface of said filtering surface.

This scanning blower is driven by a driving assembly 50. This driving assembly comprises a supporting cylinder 102 which is fixed to the annular mounting plate 72 and projects forwardly therefrom. The axis of this cylinder 102 coincides with the axis of the center of the annular mounting plate 72. Supporting cylinder 102 has a flange 104 thereon which abuts the free surface of flange 85 of supporting cylinder 84. Bolts 106 extend through mounting plate 72 and flanges 85 and 104 to fix the bearing assembly 48 and driving assembly 50 within the housing 44.

A turbine 106 is rotatably mounted in a gear and bearing unit 108 which is fixed within supporting cylinder 102 by a plurality of stationary vanes 110. An output shaft 112 extends rearwardly from the driving assembly 50 into the cylindrical portion 80 of the scanning blower 46. This shaft 112 is fixed to a splined driving plate 114 which has its external splines 116 meshing with internal splines 118 around the inner surface of the cylindrical portion 80. Holes 120 are located in the driving plate 114 to permit a flow of fluid therethrough from the outlet of the turbine into the cylindrical portion 80. A fluid inlet manifold 122 is fixed to the open free end of supporting cylinder 102. A flange 124 on manifold 122 is fixed to a flange 126 on the cylinder 102 by bolts 128. Manifold 122 has an inlet 130 and a annular outlet 132. The outlet 132 is arranged with stator vanes 134 therearound to support center piece 136 and to direct the flow of fluid against the turbine blades 138 on the turbine 106.

The bypass mechanism 52 for actuating the flaps 67 is located in housing 44 and has a cylinder 140 extending forwardly from the forward end of the fluid inlet manifold 122 and is fixed thereto by bolts. A piston 142 is slidably mounted within said cylinder with a piston rod 144 extending through the forward end of said cylinder. A star-like member 146 having an arm 148 for each flap 67 is fixedly attached to the free end of piston rod 144, said member 146 being held against an abutment on the end of the piston rod by a nut 150. A spring 152 is positioned within cylinder 140 around the piston rod 144 between the forward end of the cylinder and the face of the piston. An opening 158 extends through said cylinder at its forward end and an opening 160 extends through said cylinder at its rearward end.

Figure 2:
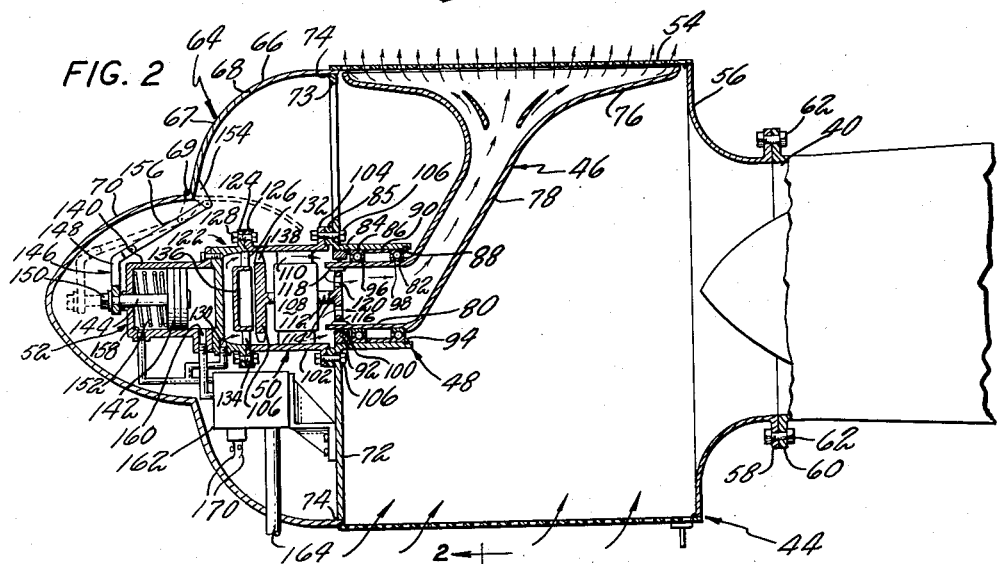
FIG. 2 is an enlarged view of the filtering device as shown in FIG. 1 and is taken generally along the line 2—2 of FIG. 3.

Each of the flaps 67 has an arm 154 fixed thereto extending inwardly from said flap at a point adjacent its hinge. A separate link 156 connects the free end of each arm 154 and the free end of each one of the arms 148 on the star-like member 146. It can now be seen that as the star-like member is moved forwardly, it in turn moves the flaps 67 to their open position as shown by the dotted lines in FIG. 2 by the action of the links 156 on the arms 154. Controls for this device comprise a solenoid operated valve 162 having one outlet connected to opening 160 in the cylinder 140 and another outlet connected to the opening 158 of said cylinder and opening 130 of manifold 122. The operating fluid for said system is directed to the valve 162 by conduit 164. As seen in FIG. 1, the other end of conduit 164 is connected to the compressor of the turbine type powerplant 18 at its last stage. A shutoff valve 166 is provided and is controllable by the helicopter pilot with a control having "On" and "Off" positions. A heater 168 may be incorporated in conduit 164 to control the amount of heat of the fluid flowing through conduit 164 between limits depending on the capacity of the heater, if heating is needed beyond that available from the fluid source. This heater is actuated by a thermostatic control fixed to the filtering cylinder 54 and a manual control for use by the pilot. The heat of the fluid being directed through the filtering cylinder can then be controlled by the icing conditions on the filter. Solenoid valve 162 is connected to a pilot's control having "Filter" and "Bypass" positions by means of electrical conduit 170. This control can comprise a control means having a switch for movement between "Filter" and "Bypass" positions.

Operation

This filter is placed into operation by the movement of the pilot's control for solenoid valve 162 to its "Filter" position and the placing of the control for valve 166 in its "On" position. The movement of the control for valve 166 to its "On" position permits fluid to pass from the last compressor stage of the turbine engine 18 through the heater 168 to the inlet of solenoid valve 162. Since the control for the solenoid valve 162 has been placed in its "Filter" position, its inlet is connected therein to its outlet which is connected to the opening 158 of cylinder 140 and opening 130 of manifold 122. Solenoid valve 162 in this position also connects the outlet connected to opening 160 to drain. This positioning of valve 162 permits the fluid to pass from conduit 164 into the cylinder 140 through opening 158 assuring that the bypass flaps 67 will be held in their closed position. The fluid also passes through opening 130 into the manifold 122 and through the stator vanes 134 where it is directed against the turbine blades 138 to rotate shaft 112. The fluid passing by the turbine blades 138 is then directed over the gear and bearing unit 108 and through the stationary vanes 110 and openings 120 in the driving plate 114 into the cylindrical portion 80 of the scanning blower. From here, the fluid is carried through the arm 78 to the nozzle 76. It can be seen that the fluid passing over the turbine blades 138 rotates the scanning blower 46 and also passes through the scanning blower 46 to provide the reverse flow of fluid through the perforated cylindrical filtering member.

If the pilot feels that there is no need for the filter to be operating, the control for the shutoff valve 166 can be placed in its "Off" position. This position on his control merely blocks off flow through conduit 164.

While the filter is in operation, the pilot can place the heater under control of the thermostat on the cylinder 54 which will automatically control the amount of heat flowing to the filtering device depending on the capacity of the heater. The pilot can also, if he wishes, merely turn the heater "On" or "Off" as he feels the heater is necessary.

If the perforated filtering cylinder 54 of the filtering device becomes blocked, through an accumulation of foreign matter and the air permitted to reach the engine inlet becomes insufficient for proper operation of the engine, the pilot should place his control for solenoid valve 162 in its "Bypass" position and also place the control for valve 166 on its "On" position, if it is not already in this position. As before, positioning of the control for valve 166 to its "On" position permits fluid to pass from the last compressor stage of the turbine engine 18 through the heater 168 to the inlet of solenoid valve 162. Now, since the control for the solenoid valve 162 has been placed in its "Bypass" position, its inlet is connected therein to its outlet which is connected to the opening 160 of cylinder 140. Solenoid valve 162 in this position also connects the outlet connected to opening 158 and 130 to drain. This positioning of valve 162 permits the fluid to pass from conduit 164 into the cylinder 140 through opening 160 to move piston 142 to the front of said cylinder (to the left as viewed in FIG. 2). As piston 140 moves to its forward position, the star-like member 146 is also moved to its forward position. As member 146 is moved forwardly, links 156 move the flaps 67 to their open position since the links 156 are connected to the free end of arms 154 on flaps 67. This placing of the flaps 67 in their open position permits air to flow therethrough into the nose section 64 of the housing from where it passes in turn through openings 73 and annular mounting plate 72 into the interior of the perforated filtering cylinder 54. From here, the air takes the same path as the filtered air would to the inlet 40 of the turbine engine 18.

It is to be understood that the invention is not limited to the specific embodiment herein illustrated and described, but may be used in other ways without departure from its spirit as defined by the following claims.

I claim:

1. Air filtering system for a powerplant including a perforated filtering inlet member having a surface of revolution, one end of said member having an opening for the outlet of fluid from said member, the other end of said member having a nose section connected thereto, nozzle means mounted in said member for rotation, said nozzle means having its outlet directed generally radially towards the inner surface of said member and in juxtaposed relation thereto, separate means for driving said nozzle means, a turbine connected to said driving means, means connecting said driving means to said nozzle means, means for bypassing said filtering member comprising a bypass door in said nose section, means for actuating said door including a cylinder and piston unit, a source of fluid under pressure, and means connecting said source of fluid to said member and to said turbine for maintaining said door in its closed position and for driving said turbine to rotate said nozzle means.

2. Air filtering system for a powerplant including a perforated filtering member having a surface of revolution, one end of said member having an opening for the outlet of fluid from said member, the other end of said member having a nose section connected thereto, nozzle means having an inlet and outlet, means mounting said nozzle means in said member for rotation about an axis coincident with the axis of said member, said nozzle means having its outlet directed generally radially towards the inner surface of said member and in juxtaposed relation thereto, separate means for driving said nozzle including an input and output shaft, a turbine connected to said input shaft, and means connecting said output shaft to said nozzle means, said driving means also having a fluid inlet and outlet, means connecting the outlet of said driving means to the inlet of said nozzle means.

3. Air filtering system for a powerplant including a perforated filtering member having a surface of revolution, one end of said member having an opening for the outlet of fluid from said member, the other end of said member having a nose section connected thereto, nozzle means having an inlet and outlet, means mounting said nozzle means in said member for rotation about an axis coincident with the axis of said member, said nozzle means having its outlet directed generally radially towards the inner surface of said member and in juxtaposed relation thereto, means for driving said nozzle means including an input and output shaft, a turbine connected to said input shaft, means connecting said output shaft to said nozzle means, said driving means also having a fluid inlet and outlet, means connecting the outlet of said driving means to the inlet of said nozzle means, said nose section having openings for permitting a fluid into said perforated member without passing through the perforations of said member, and a bypass door for each opening to control the passage of fluid therethrough.

4. Air filtering system for a powerplant including a perforated filtering member having a surface of revolution, one end of said member having an opening for the outlet of fluid from said member, the other end of said member having a nose section connected thereto, nozzle means having an inlet and outlet, means mounting said nozzle means in said member for rotation about an axis coincident with the axis of said member, said nozzle means having its outlet directed generally radially towards the inner surface of said member and in juxtaposed relation thereto, means for driving said nozzle means including an input and output shaft, a turbine connected to said input shaft, means connecting said output shaft to said nozzle means, said driving means also having a fluid inlet and outlet, means connecting the outlet of said driving means to the inlet of said nozzle means, said nose section having openings for permitting a fluid into said perforated member without passing through the perforations of said member, a bypass door for each opening to control the passage of fluid therethrough, and bypass door actuating means in said nose section for moving said doors between open and closed positions.

5. Air filtering system for a powerplant including a perforated filtering member having a surface of revolution, one end of said member having an opening for the outlet of fluid from said member, the other end of said member having a nose section connected thereto, nozzle means having an inlet and outlet, means mounting said nozzle means in said member for rotation about an axis coincident with the axis of said member, said nozzle means having its outlet directed generally radially towards the inner surface of said member and in juxtaposed relation thereto, means for driving said nozzle means including an input and output shaft, a turbine connected to said input shaft, means connecting said output shaft to said nozzle means, said driving means also having a fluid inlet and outlet, means connecting the outlet of said driving means to the inlet of said nozzle means, said nose section having openings for permitting a fluid into said perforated member without passing through the perforations of said member, a bypass door for each opening to control the passage of fluid therethrough, bypass door actuating means in said nose section for moving said door between open and closed positions, said bypass door actuating means including a cylinder and piston, said piston having a piston rod extending through one end of said cylinder, and linkage means connecting the free end of said piston rod to said bypass doors transmitting the movement of said piston rod to said doors to open and close them.

6. Air filtering means for the inlet of a powerplant comprising, a perforated member having a surface of revolution having an opening on each end, one end of said member having means for attaching it to the inlet of a powerplant, a mounting device fixed at the other end of said member, bearing means supported by said mounting device, said bearing means having an axis of bearing support which coincides with the axis of said perforated member, a cylindrical member mounted for rotation in said bearing means, a nozzle having an inlet and outlet, said nozzle having its outlet directed generally radially against the inner surface of said member and in juxtaposed relation thereto, a tubular arm extending from said cylindrical member to said nozzle for supporting said nozzle and providing a passageway from said cylindrical member to the inlet of said nozzle, a driving means for said nozzle, said driving means having an input and output shaft, a turbine connected to said input shaft, and means connecting said output shaft to said cylindrical member, said driving means also including an inlet to said turbine, an outlet from said turbine, and a passageway from the outlet of said turbine to the interior of said cylindrical member.

7. Air filtering means for the inlet of a powerplant comprising, a perforated member having a surface of revolution having an opening on each end, one end of said member having means for attaching it to the inlet of a powerplant, a nose section connected to the other end of said member and extending outwardly therefrom, a mounting device fixed at the other end of said member, bearing means supported by said mounting device, said bearing means having an axis of bearing support which coincides with the axis of said perforated member, a cylindrical member mounted for rotation in said bearing means, a nozzle having an inlet and outlet, said nozzle having its outlet directed generally radially against the inner surface of said member and in juxtaposed relation thereto, a tubular arm extending from said cylindrical member to said nozzle for supporting said nozzle and providing a passageway from said cylindrical member to the inlet of said nozzle, a driving means for said nozzle located in said nose section, said driving means having an input and output shaft, a turbine connected to said input shaft, means connecting said output shaft to said cylindrical member, said driving means also including an inlet to said turbine, an outlet from said turbine, and a passageway from the outlet of said turbine to the interior of said cylindrical member, said nose section having openings for permitting a fluid into said perforated member without passing through the perforations of said member, and a bypass door for each opening to control the passage of fluid therethrough.

8. Air filtering means for the inlet of a powerplant comprising, a perforated member having a surface of revolution having an opening on each end, one end of said member having means for attaching it to the inlet of a powerplant, a nose section connected to the other end of said member and extending outwardly therefrom, a mounting device fixed at the other end of said member, bearing means assembly supported by said mounting device, said bearing means having an axis of bearing support which coincides with the axis of said perforated member, a cylindrical member mounted for rotation in said bearing means, a nozzle having an inlet and outlet, said nozzle having its outlet directed generally radially against the inner surface of said member and in juxtaposed relation thereto, a tubular arm extending from said cylindrical member to said nozzle for supporting said nozzle and providing a passageway from said cylindrical member to the inlet of said nozzle, a driving means for said nozzle, said driving means having an input and output shaft, a turbine connected to said input shaft, means connecting said output shaft to said cylindrical member, said driving means also including an inlet to said turbine, an outlet from said turbine, and a passageway from the outlet of said turbine to the interior of said cylindrical member, said nose section having openings for permitting a fluid into said perforated member without passing through the perforations of said member, a bypass door for each opening to control the passage of fluid therethrough, and bypass door actuating means in said nose section for moving said doors between open and closed positions.

9. Air filtering means for the inlet of a powerplant comprising, a perforated member having a surface of revolution having an opening on each end, one end of said member having means for attaching it to the inlet of a powerplant, a nose section connected to the other end of said member and extending outwardly therefrom, a mounting device fixed at the other end of said member, bearing means assembly supported by said mounting device, said bearing means having an axis of bearing support which coincides with the axis of said perforated member, a cylindrical member mounted for rotation in said bearing means, a nozzle having an inlet and outlet, said nozzle having its outlet directed generally radially against the inner surface of said member and in juxtaposed relation thereto, a tubular arm extending from said cylindrical member to said nozzle for supporting said nozzle and providing a passageway from said cylindrical member to the inlet of said nozzle, a driving means for said nozzle, said driving means having an input and output shaft, a turbine connected to said input shaft, means connecting said output shaft to said cylindrical member, said driving means also including an inlet to said turbine, an outlet from said turbine, and a passageway from the outlet of said turbine to the interior of said cylindrical member, said nose section having openings for permitting a fluid into said perforated member without passing through the perforations of said member, a bypass door for each opening to control the passage of fluid therethrough, bypass door actuating means in said nose section for moving said doors between open and closed positions, said bypass door actuating means including a cylinder and piston, said piston having a piston rod extending through one end of said cylinder, and linkage means connecting the free end of said piston rod to said bypass doors transmitting the movement of said piston rod to said doors to open and close them.

10. Air filtering means for the inlet of a powerplant comprising, a perforated member having a surface of revolution having an opening on each end, one end of said member having means for attaching it to the inlet of a powerplant, a nose section connected to the other end of said member and extending outwardly therefrom, a mounting device fixed at the other end of said member, bearing means assembly supported by said mounting device, said bearing means having an axis of bearing support which coincides with the axis of said perforated member, a cylindrical member mounted for rotation in said bearing means, a nozzle having an inlet and outlet, said nozzle having its outlet directed generally radially against the inner surface of said member and in juxtaposed relation thereto, a tubular arm extending from said cylindrical member to said nozzle for supporting said nozzle and providing a passageway from said cylindrical member to the inlet of said nozzle, a driving means for said nozzle, said driving means having an input and output shaft, a turbine connected to said input shaft, means connecting said output shaft to said cylindrical member, said driving means also including an inlet to said turbine, an outlet from said turbine, and a passageway from the outlet of said turbine to the interior of said cylindrical member, said nose section having openings for permitting a fluid into said perforated member without passing through the perforations of said member, a bypass door for each opening to control the passage of fluid therethrough, bypass door actuating means in said nose section for moving said doors between open and closed positions, said bypass door actuating means including a cylinder and piston, said piston having a piston rod extending through one end of said cylinder, linkage means connecting the free end of said piston rod to bypass doors transmitting the movement of said piston rod to said doors to open and close them, said cylinder having an inlet to each end for directing a fluid to each end of said piston, a source of fluid, and valve means for directing fluid from said source to the inlet of said cylinder for reacting against the end of said piston for closing said doors and to the inlet to said turbine while connecting the other inlet of said cylinder to drain.

11. Air filtering means for the inlet of a powerplant comprising, a perforated member having a surface of revolution having an opening on each end, one end of said member having means for attaching it to the inlet of a powerplant, a mounting plate fixed at the other end of said member, bearing means assembly supported by said mounting plate, said bearing means having an axis of bearing support which is parallel with the axis of said perforated member, a cylindrical member mounted for rotation in said bearing means, a nozzle having an inlet and outlet, said nozzle having its outlet directed generally radially outwardly toward the inner surface of said member and in juxtaposed relation thereto, a tubular arm extending from said cylindrical member to said nozzle for supporting said nozzle and providing a passageway from said cylindrical member to the inlet of said nozzle, internal splines on said cylindrical member, driving means for said nozzle, said driving means having an input and output shaft, a turbine connected to said input shaft, and a splined plate on said output shaft engaging the internal splines on said cylindrical member, said plate having openings therethrough, said driving means also including an inlet to said turbine and an outlet from said turbine, and passageway means connecting the outlet of said turbine to the openings on said plate.

12. Air filtering system for a powerplant including a filtering inlet member having a perforated surface of revolution formed about an axis, one end of said member having an opening for the outlet of fluid from said member, the other end of said member having a nose section connected thereto, nozzle means mounted in said member for rotation, said nozzle means having its outlet directed generally radially outwardly with respect to said axis towards the inner surface of said member and in juxtaposed relation thereto whereby the discharge from said nozzle flows in a direction from within said member through said perforated surface, separate means for driving said nozzle means during powerplant operation, said separate means for driving said nozzle being located within said nose section, a turbine connected to said driving means, said turbine being located within said nose section, means connecting said driving means to said nozzle means, a fluid supply means, means for directing fluid from said supply to said turbine, and means directing all of said fluid from said turbine to said nozzle means.

13. Air filtering system for a powerplant including a perforated filtering inlet member having a surface of revolution, one end of said member having an opening for the outlet of fluid from said member, the other end of said member having a nose section connected thereto, nozzle means mounted in said member for rotation, said nozzle means having its outlet directed generally radially towards the inner surface of said member and in juxtaposed relation thereto, separate means for driving said nozzle means during powerplant operation, a turbine connected to said driving means, means connecting said driving means to said nozzle means, a fluid supply means, means for bypassing said filtering member comprising a bypass door in said nose section, means for actuating said door, means for directing fluid from said supply to said turbine and to said door actuating means to rotate said turbine and hold said door closed, and means for directing all of said fluid from said turbine to said nozzle means.

References Cited in the file of this patent
UNITED STATES PATENTS

| | | |
|---|---|---|
| 2,026,834 | Holly | Jan. 7, 1936 |
| 2,178,463 | Bahnson | Oct. 31, 1939 |
| 2,534,171 | Kirby | Dec. 12, 1950 |
| 2,591,198 | Ringe | Apr. 1, 1952 |
| 2,623,610 | Buechel | Dec. 30, 1952 |
| 2,752,111 | Schairer | June 26, 1956 |
| 2,812,036 | Hopper | Nov. 5, 1957 |
| 2,823,760 | Anderson | Feb. 18, 1958 |